United States Patent
Erlacher et al.

(10) Patent No.: US 11,332,041 B2
(45) Date of Patent: May 17, 2022

(54) SEAT MODULE FOR A MOTOR VEHICLE

(71) Applicant: MAGNA STEYR Fahrzeugtechnik AG & Co KG, Graz (AT)

(72) Inventors: Manuel Erlacher, Radenthein (AT); Franz Planka, St. Andrä (AT); Martin Rodler, Weiz (AT); Harald Zachnegger, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 17/089,800

(22) Filed: Nov. 5, 2020

(65) Prior Publication Data
US 2021/0155125 A1    May 27, 2021

(30) Foreign Application Priority Data
Nov. 27, 2019  (EP) .................................... 19211814

(51) Int. Cl.
| | | |
|---|---|---|
| *B60N 2/005* | (2006.01) | |
| *A61G 3/06* | (2006.01) | |
| *B60N 2/22* | (2006.01) | |
| *B60N 2/30* | (2006.01) | |

(52) U.S. Cl.
CPC ............. *B60N 2/005* (2013.01); *A61G 3/063* (2013.01); *B60N 2/22* (2013.01); *B60N 2/3097* (2013.01)

(58) Field of Classification Search
CPC ....... B60N 2/005; A61G 3/063; A61G 3/0825
See application file for complete search history.

(56) References Cited

U.S. PATENT DOCUMENTS

| | | | | |
|---|---|---|---|---|
| 3,623,631 A | * | 11/1971 | Ford ...................... | B65D 19/08 220/628 |
| 5,101,964 A | * | 4/1992 | Westphal .............. | B23P 19/001 108/55.5 |
| 5,497,708 A | * | 3/1996 | Jeruzal ................... | B65D 19/44 108/54.1 |
| 5,529,185 A | * | 6/1996 | Alspach ............. | B60N 2/01508 108/55.3 |
| 8,939,688 B2 | * | 1/2015 | Fell ..................... | B65D 19/0095 410/80 |
| 2002/0027368 A1 | * | 3/2002 | Volz .................... | B62D 25/2036 296/66 |
| 2009/0066118 A1 | * | 3/2009 | Tosaka ................... | B60N 2/005 296/204 |
| 2013/0180790 A1 | * | 7/2013 | Bisror ................... | B60L 3/0046 180/68.5 |

FOREIGN PATENT DOCUMENTS

| | | |
|---|---|---|
| DE | 10018407 A1 | 11/2001 |
| JP | 2017047750 A * | 3/2017 |

* cited by examiner

*Primary Examiner* — Timothy J Brindley
(74) *Attorney, Agent, or Firm* — Jordan IP Law, LLC; Todd A. Vaughn

(57) ABSTRACT

A seat module for a motor vehicle that includes a carrier element having at least one seat row upon which at least two seats are secured. Each seat row has walls defining an opening which is accessible from outside of the motor vehicle and which extends laterally as a hollow space into the carrier element. The walls are fixed at least partially peripherally to facilitate raising of the seat module via introduction of a lifting element from outside of the motor vehicle into the hollow space for installation of the seat module into the motor vehicle or removal of the seat module from the motor vehicle.

11 Claims, 3 Drawing Sheets

SEAT MODULE FOR A MOTOR VEHICLE

CROSS-REFERENCE TO RELATED APPLICATIONS

The present application claims priority 35 U.S.C. § 119 to European Patent Publication No. EP 19211814.9 (filed on Nov. 27, 2019), which is hereby incorporated by reference in its complete entirety.

TECHNICAL FIELD

Embodiments relate to a seat module for a motor vehicle, and a motor vehicle having at least one such seat module.

BACKGROUND

It is known that motor vehicles generally have seats, such as, for example, bench type seats, for transporting persons in the motor vehicle. The seats are often arranged in the form of seat rows. For example, larger passenger vehicles, such as vans and small buses, in addition to a seat row which comprises the driver's seat, may comprise two rear seat rows which are accessible, for example, via a side door of the vehicle, in particular, via a sliding door.

It is also known that motor vehicles can be used to transport goods. Seats or seat rows can often also be folded away or disassembled in order to increase the space for transport of goods.

It is disadvantageous, however, that with conventional seats or bench type seats which can be disassembled, the disassembly takes up a relatively large amount of time and is difficult. When seats and seat benches are folded over, they generally also take up a relatively large amount of storage space in the folded-away position so that the space available for products or goods is reduced.

SUMMARY

In accordance with one or more embodiments, a seat module for a motor vehicle is provided which enables simple and effective conversion of the interior of a motor vehicle from passenger transport into goods transport.

In accordance with one or more embodiments, a motor vehicle having such a seat module is provided which is convertible in a simple and effective manner from a passenger transport vehicle into a goods transport vehicle.

In accordance with one or more embodiments, a seat module for a motor vehicle, the seat module comprising: a carrier element; and at least one seat row having at least two seats which are secured to the carrier element, at least one opening which is accessible from outside and which extends as a hollow space into the seat module, wherein the hollow space has walls which are mechanically fixed at least partially circumferentially to facilitate raising of the seat module to introduce an elongate lifting element (e.g., a forklift tine) from outside through the opening into the hollow space and raising of the lifting element.

In accordance with one or more embodiments, a seat row having at least two seats, wherein the seats may also be provided in the form of a bench type seat, is constructed with openings in such a manner that using a lifting element, such as, in particular, a tine of a forklift truck, the seat row is lifted in a simple manner into a vehicle and out of a vehicle. In this instance, the openings are arranged in such a manner that the lifting element, in particular, the fork tines, is/are introduced from outside of the vehicle through the opening into a hollow space which is delimited at least partially circumferentially by sidewalls so that the sidewalls of the hollow space at least partially abut the lifting element to facilitate raising of the seat module for installation in the motor vehicle and removal from the motor vehicle.

In accordance with one or more embodiments, the hollow space particularly comprises a blind hole and/or a hollow profile.

In accordance with one or more embodiments, the hollow space has sidewalls which are mechanically fixed at least partially circumferentially/peripherally.

In accordance with one or more embodiments, the hollow space has sidewalls which are mechanically fixed over the entire circumference/perimeter and also hollow spaces which do not have fixed sidewalls over the entire circumference/perimeter, such that at least in an installation position at the top, a fixed sidewall is formed. Instead of solid sidewalls, for example, profiles, grids or rods having sufficient stability to facilitate lifting using a lifting element. It is possible to have all forms of limited hollow spaces which are constructed in such a manner to receive a lifting element, such as a forklift tine, even when over a partial circumference/perimeter, for example, at the bottom or side, they have no or only reduced fixed walls or wall attachments. The fixed walls comprise, for example, a form having C-shaped cross-section or an N-shaped cross-section.

In accordance with one or more embodiments, a seat module is configured not only for introduction into the motor vehicle during the production of the motor vehicle in order to be fixed at that location, but instead also for installation and removal during normal use of the motor vehicle, for example, by a vehicle owner, using the lifting element so that at all times a vehicle is convertible for transport of goods or for transport of passengers.

In accordance with one or more embodiments, the seat module, preferably the carrier element, therefore has the at least one opening which is accessible from outside of the motor vehicle and which extends as a hollow space into the seat module, preferably into the carrier element.

In accordance with one or more embodiments, preferably, the seat module has two openings which are accessible from outside of the motor vehicle and which in each case extend as a hollow space into the seat module. The hollow spaces are constructed in a mechanically fixed manner or have sidewalls which are mechanically fixed at least partially circumferentially/peripherally to facilitate raising of the seat module via introduction of two profiled lifting elements, in particular, two fork tines of a forklift truck, from outside of the motor vehicle through the openings into the respective hollow spaces, and raising of the lifting elements. The seat module can then preferably be lifted via the two tines of a conventional stacker truck or forklift truck out of the vehicle and raised into the vehicle.

In accordance with one or more embodiments, the seat module comprises at least two seat rows each having at least two seats which are secured to the carrier element. The two seats may in each case also be constructed as a bench with at least two seating places. In the installation position, the two seat rows are preferably arranged above the two openings and hollow spaces. The seats of a seat row are preferably secured to the carrier element via seat rails.

In accordance with one or more embodiments, the hollow space(s) extend(s) in the transverse vehicle direction and consequently preferably along the one or more seat rows. The seat rows preferably extend above the hollow spaces, parallel with the hollow spaces.

In accordance with one or more embodiments, the carrier element comprises a plate which forms a base of the seat module. The plate is to form a stable base in order to facilitate the lifting of the seat row or seat rows. The plate is configured to connect a plurality of seat rows in a mechanically stable manner. The plate is also configured, for example, to partially form a foot space for passengers and/or be partially fitted with a carpet.

In accordance with one or more embodiments, at least one external portion of the plate is configured to be folded upwardly, folded inwardly, pushed inwardly or removed in another manner. The base face of the carrier element can thereby be reduced in order to be able to lift the seat module into and out of the motor vehicle through a smaller door opening.

In accordance with one or more embodiments, the carrier element comprises a profile and/or a tunnel-like member to connect two regions of the seat module to each other in a mechanically secure manner. As a result of the profile or the tunnel-like member, in particular, regions of the seat module around two different openings and hollow spaces and/or regions of two seat rows can be connected to each other. A seat module whose carrier element comprises a profile and/or tunnel-like member may preferably not comprise any plate or may additionally comprise a plate as a base.

In accordance with one or more embodiments, a motor vehicle which has a base region which is constructed to carry a seat module, as described herein, the motor vehicle having at least one door opening, such as, for example a side door, which is configured to be opened sufficiently wide to facilitate pushing of the seat module through the door opening out of the motor vehicle and/or into the motor vehicle. The side door may be constructed, in particular, as a sliding door having preferably one or two leaves.

In accordance with one or more embodiments, the seats of the seat row, preferably at least one rear seat row, of the seat module have backrests which can be folded over, preferably can be folded forwards, so that the seat module can be pushed through the door opening out of the motor vehicle and into the motor vehicle. As a result of the foldable backrests, the seat module may, in particular in the case of lateral removal or introduction into the motor vehicle, have a smaller cross-sectional surface-area and therefore a smaller door opening may be sufficient.

In accordance with one or more embodiments, the motor vehicle has a locking mechanism to lock a seat module which has been pushed into the motor vehicle and to unlock it for removal from the motor vehicle. The seat module can thereby be secured in its intended position in the motor vehicle, for example, via screws, wing screws, dovetail extending transversely relative to the travel direction or via various rapid-fit closures.

In accordance with one or more embodiments, in addition to a seat module, at least one goods module may also be provided, wherein the goods module also has at least one, preferably two openings with hollow spaces, preferably arranged in an identical manner and formed in an identical manner to that in the seat module so that the goods module can be raised in that one or two profiled lifting elements, in particular the same ones as for lifting the seat module, are introduced from outside through the openings into the hollow spaces and the lifting element is raised. It is thereby possible, in a simple manner, for example, using a forklift truck, for a seat module in a motor vehicle to be replaced with a goods module, or vice versa, in particular, by laterally removing or introducing the seat module into the vehicle.

In accordance with one or more embodiments, the goods module may in particular, be formed by a commercially available pallet. The tines of a commercially available forklift truck can then be used as lifting elements.

DRAWINGS

Embodiments will be illustrated by way of example in the drawings and explained in the description below.

DESCRIPTION

As illustrated in FIGS. 1A to 1H, steps are shown for converting a motor vehicle from passenger transport to goods transport via a seat module in accordance with one or more embodiments.

Figure 1:
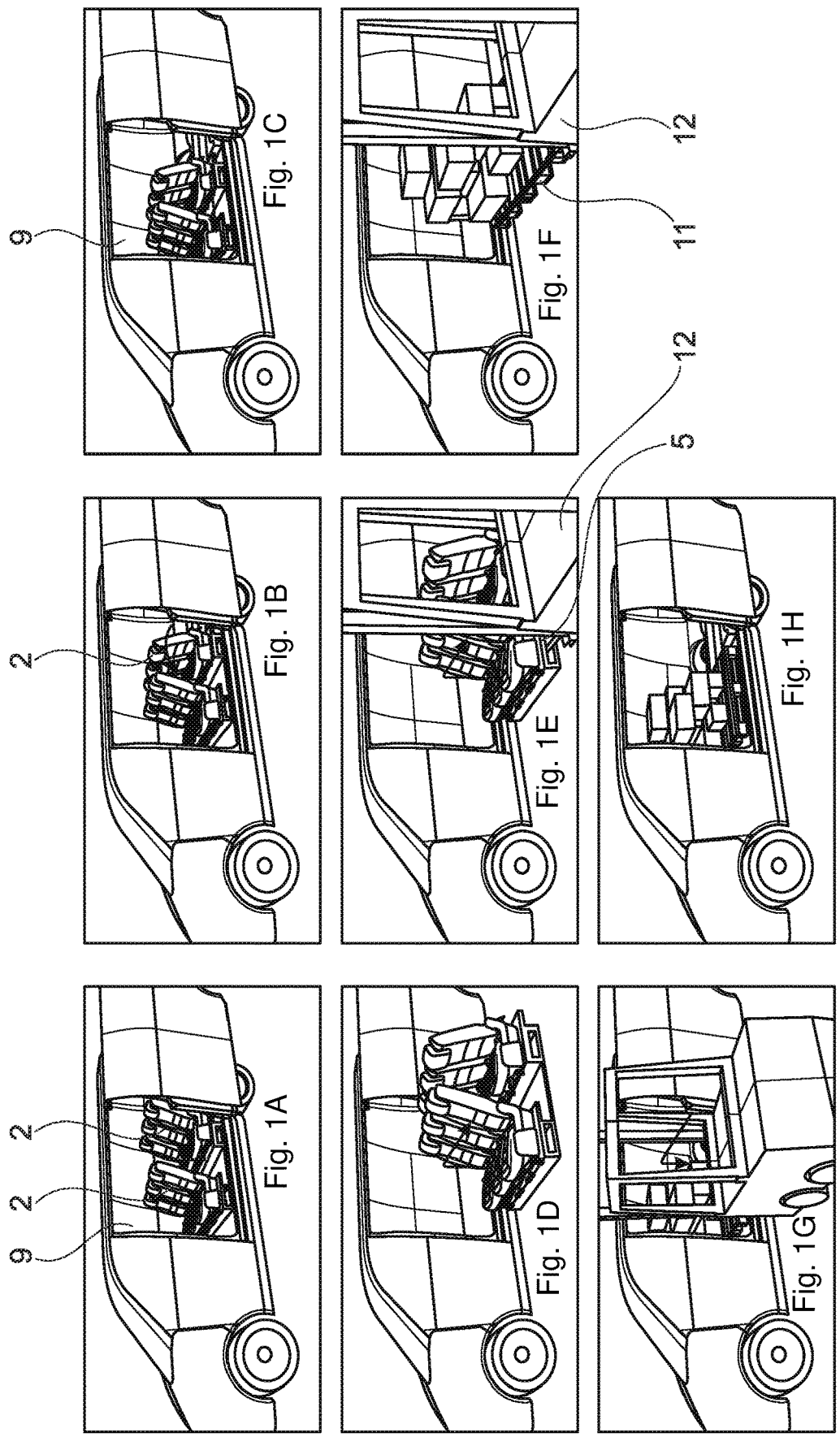
FIGS. 1A to 1H illustrate a perspective view of process or method steps for converting a motor vehicle from carrying passengers to transporting goods via a seat module, in accordance with one or more embodiments.

As illustrated in FIG. 1A, the vehicle is equipped with a seat module in accordance with one or more embodiments having two seat rows 2 to facilitate transport of passengers. A lateral sliding door of the motor vehicle is in an open state to release a lateral door opening 9. The seat module can be lifted through the door opening 9 out of the motor vehicle, as illustrated in greater detail in FIGS. 1b to 1e.

As illustrated in FIG. 1B, the folding forward of the rear seat row 2 in the direction of the arrow depicted (i.e., counterclockwise) to reduce the overall length of the seat module, if required. The seat module is in an unlocked state in order to release the fixed connection between the seat module and vehicle.

As illustrated in FIG. 1C, the seat module, if necessary, is moveable in the direction of the door opening 9 (i.e., laterally with respect to the longitudinal direction of the motor vehicle), through which the seat module is removed.

As illustrated in FIGS. 1D and 1E, the seat module may then be lifted and removed from the motor vehicle. FIG. 1E illustrates the required lifting element 5 on a forklift truck 12, which is hidden in FIG. 1D. Other types of movable lifting devices may alternatively be used. The seat module is lifted with the lifting elements 5 in the arrow direction and afterwards pushed laterally out of the vehicle.

As illustrated in FIGS. 1F to 1H, the motor vehicle is loaded with a goods module and with products and goods. The goods module may be pushed into the motor vehicle using the same lifting elements 5 and the same forklift truck 12 and lowered in the motor vehicle. The goods module is formed by a commercially available pallet on which goods may be located already at the time of introduction into the vehicle.

Figure 2:
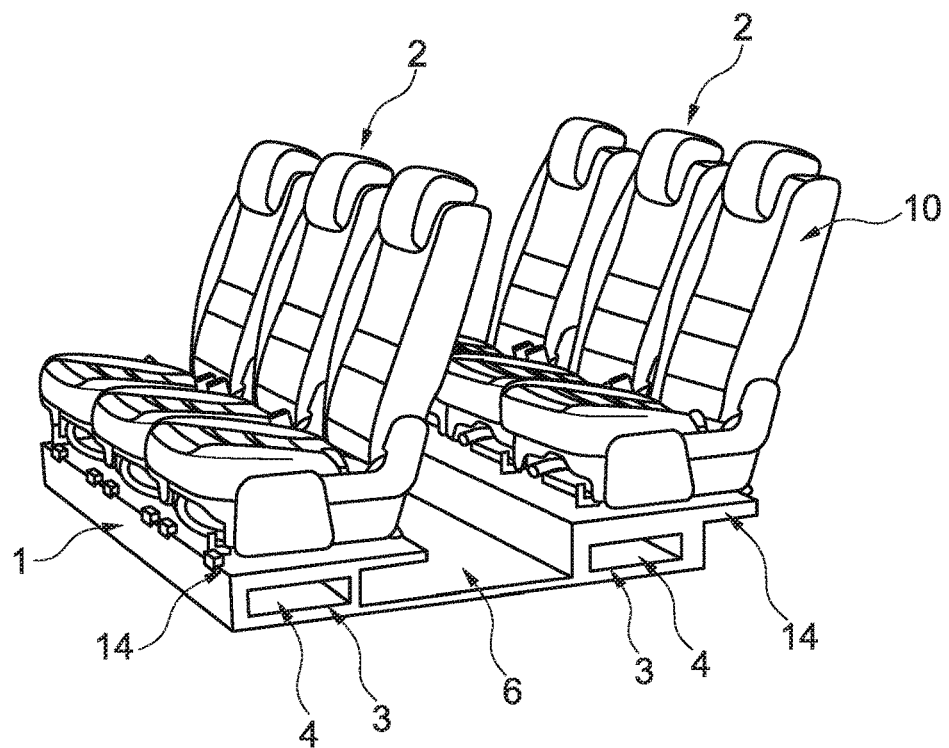
FIG. 2 illustrates a perspective view of a seat module in accordance with a first embodiment.
Figure 3:
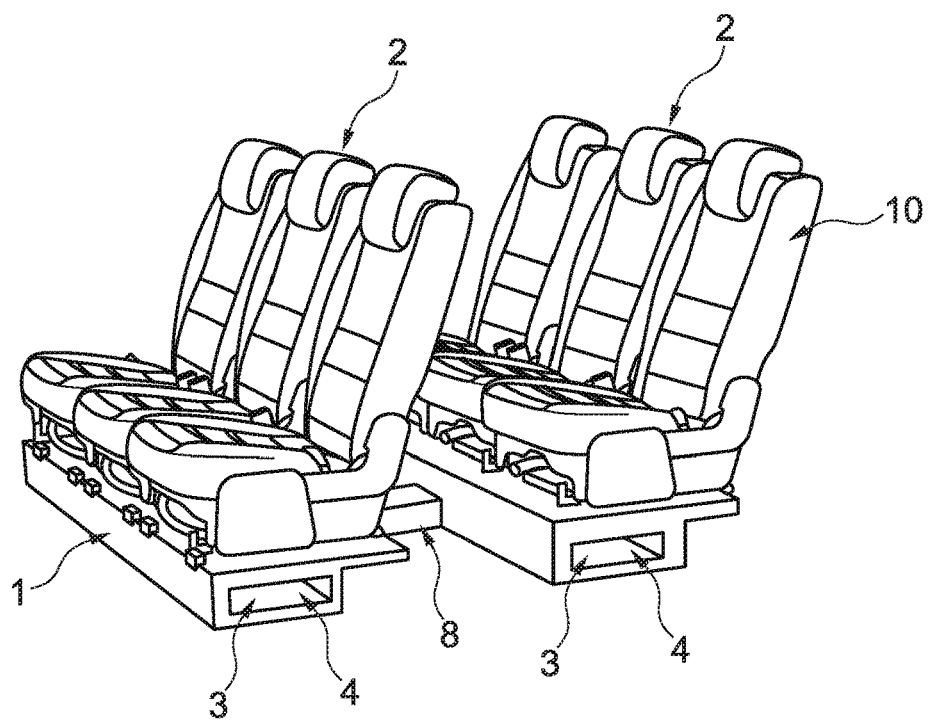
FIG. 3 illustrates a perspective view of a seat module in accordance with a second embodiment.

As illustrated in FIGS. 2 and 3, embodiments of a seat module are provided. In each embodiment, the seat module comprises a carrier element 1 and two seat rows 2 that each have a plurality seats (in the illustrated examples, three) which are secured to the carrier element 1. The seat module, i.e., the carrier element 1, has a pair of spaced apart openings 3 which are accessible from outside of the vehicle. The openings 3 extend as a hollow space 4 into the carrier element 1 of the seat module. Each hollow space 4 has mechanically fixed sidewalls. The hollow spaces 4 are in particular constructed as hollow profiles or as comparable elongate holes of the carrier element 1.

The seat module is configured to be raised by an elongate lifting element 5 (See, FIGS. 1a to 1h) such as, for example, a forklift tine being introduced from outside of the vehicle through the opening 3 into the hollow space 4 and the raising of the lifting element 5. After the lifting, the seat module can be removed from the interior cabin of the motor vehicle by the lifting element 5, in particular, the forklift truck 12.

As illustrated in FIG. 2, the seats of the seat rows 2 can be secured with their seat rails to a connection plate 14 of the carrier element 1. A continuous plate 6 also forms the foot space in order to connect the seat rows 2 and to form a unit, a module.

As illustrated in FIG. 3, the seat rows 2 are configured for connection via a tunnel-like member 8 or a profile.

Figure 4:
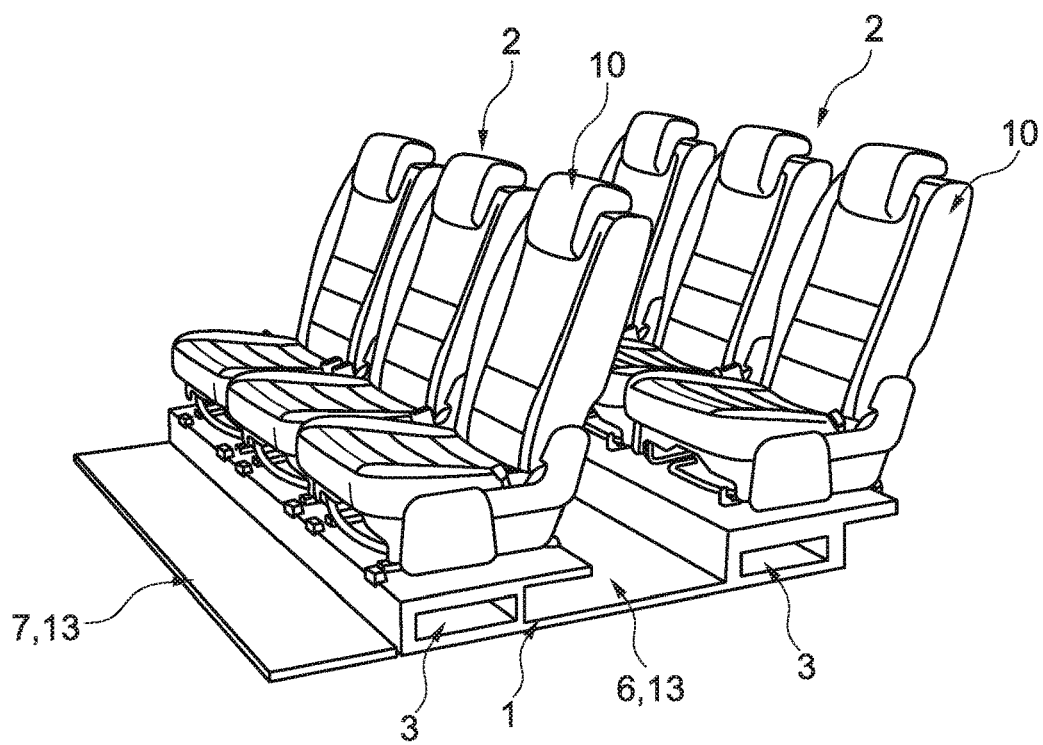
FIG. 4 illustrates a perspective view of a seat module in accordance with a third embodiment.
Figure 5:
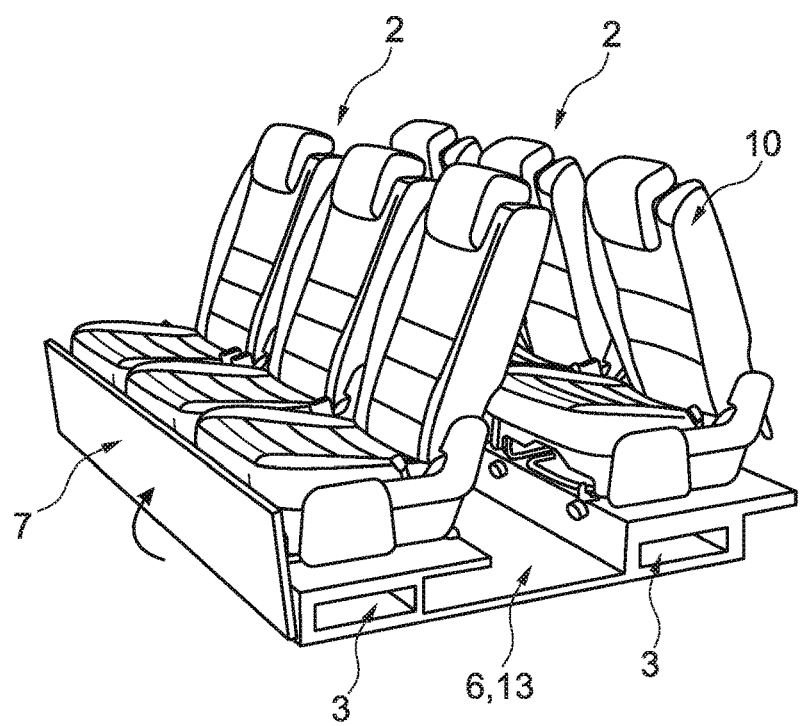
FIG. 5 illustrates a perspective view of the seat module of FIG. 4 with the front base portion folded upwards.

As illustrated in FIGS. 4 and 5, an embodiment of the seat module is provided having foldable attachment components. As a result of an external portion 7 of the plate 6 being folded upwardly (i.e., in a clockwise direction towards the seats) and the backrests 10 of the rear seat row being folded forwardly (i.e., in a counterclockwise direction), less space and a smaller door opening 9 for removing or introducing the seat module into a motor vehicle are required. In the illustrated embodiment, a carpet 13 for the front seat row 2 is also further installed so as to be able to be folded in order to facilitate the disassembly and removal of the seat module from the vehicle. The carpet 13 is thereby not loaded during goods transport. Furthermore, the cleaning of the carpet 13 in the disassembled state is facilitated.

The terms "coupled," "attached," "fastened," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 Carrier element
2 Seat row
3 Opening
4 Hollow space
5 Lifting element
6 Plate
7 External portion of the plate
8 Tunnel-like member
9 Door opening
10 Backrest
11 Goods module
12 Forklift truck
13 Carpet
14 Connection plate for seats

What is claimed is:

1. A seat module for a motor vehicle, the seat module comprising:
   a carrier element having at least one seat row upon which at least two seats are secured, each seat row having walls defining an opening which is accessible from outside of the motor vehicle and which extends laterally as a hollow space into the carrier element, the walls being fixed at least partially peripherally to facilitate raising of the seat module via introduction of a lifting element from outside of the motor vehicle into the hollow space for installation of the seat module into the motor vehicle or removal of the seat module from the motor vehicle,
   wherein the carrier element comprises a plate which forms a base of the seat module, the plate having at least one external portion thereof configured for movement to be folded upward, folded inward, pushed inward, or removed.

2. The seat module of claim 1, wherein the carrier element comprises a profile and/or a tunnel-like member to mechanically connect two regions of the seat module to each other.

3. A seat module for a motor vehicle, the seat module comprising:
   a carrier element having at least two spaced apart seat rows upon which at least two seats are secured, each seat row having walls defining an opening which is accessible from outside of the motor vehicle and which extends laterally as a hollow space into the carrier element, the walls being fixed at least partially peripherally to facilitate raising of the seat module via introduction of a lifting element from outside of the motor vehicle into the hollow space for installation of the seat module into the motor vehicle or removal of the seat module from the motor vehicle.

4. The seat module of claim 3, wherein the carrier element comprises a plate which forms a base of the seat module.

5. The seat module of claim 4, wherein at least one external portion of the plate is configured for movement to be folded upward, folded inward, pushed inward, or removed.

6. The seat module of claim 3, wherein the carrier element comprises a profile and/or a tunnel-like member to mechanically connect two adjacent rows to each other.

7. A motor vehicle, comprising:
   a base region;
   at least one door which is moveable to define a door opening; and
   a seat module, mounted on the base region, that includes a carrier element having at least one seat row upon which at least two seats are secured, each seat row having walls defining an opening which is accessible from outside of the motor vehicle and which extends laterally as a hollow space into the carrier element, the walls being fixed at least partially peripherally to facilitate raising of the seat module via introduction of a lifting element through the door opening from outside of the motor vehicle and into the hollow space for installation of the seat module into the motor vehicle or removal of the seat module from the motor vehicle,
   wherein the carrier element comprises a plate which forms a base of the seat module, the plate having at least one external portion thereof configured for movement to be folded upward, folded inward, pushed inward, or removed.

8. The motor vehicle of claim 7, wherein the seats of at least one seat row, comprise backrests that are configured to be folded forwardly to facilitate movement of the seat module through the door opening.

9. The motor vehicle of claim 7, further comprising a locking mechanism to lock a seat module into an installation position.

10. The motor vehicle of claim 7, further comprising a locking mechanism to unlock a seat module that from an installation position in the motor vehicle for removal from the motor vehicle.

11. The motor vehicle of claim 7, wherein the carrier element comprises a profile and/or a tunnel-like member to mechanically connect two regions of the seat module to each other.

\* \* \* \* \*